United States Patent
Collard et al.

(10) Patent No.: US 7,302,680 B2
(45) Date of Patent: Nov. 27, 2007

(54) DATA REPACKING FOR MEMORY ACCESSES

(75) Inventors: Jean-Francois C. Collard, Santa Clara, CA (US); Kalyan Muthukumar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 684 days.

(21) Appl. No.: 10/287,212

(22) Filed: Nov. 4, 2002

(65) Prior Publication Data

US 2004/0088501 A1    May 6, 2004

(51) Int. Cl.
*G06F 9/45* (2006.01)
(52) U.S. Cl. ............... 717/160; 717/150; 717/159; 717/161
(58) Field of Classification Search ........ 717/160–161, 717/150, 159; 711/112–202; 712/241
See application file for complete search history.

(56) References Cited

U.S. PATENT DOCUMENTS

| | | | | |
|---|---|---|---|---|
| 5,465,343 | A * | 11/1995 | Henson et al. ............... | 711/112 |
| 6,766,446 | B2 * | 7/2004 | Ganapathy et al. .......... | 712/241 |
| 2003/0046671 | A1 * | 3/2003 | Bowen ......................... | 717/141 |
| 2003/0120882 | A1 * | 6/2003 | Granston et al. ............ | 711/169 |
| 2003/0154469 | A1 * | 8/2003 | Anderson et al. ............ | 717/161 |
| 2003/0163679 | A1 * | 8/2003 | Ganapathy et al. .......... | 712/241 |
| 2003/0182511 | A1 * | 9/2003 | Asal et al. .................... | 711/125 |
| 2004/0003386 | A1 * | 1/2004 | Tal et al. ...................... | 717/160 |
| 2004/0088515 | A1 * | 5/2004 | Schreiber et al. ............ | 711/202 |
| 2004/0268051 | A1 * | 12/2004 | Berg et al. .................... | 711/137 |
| 2006/0156284 | A1 * | 7/2006 | Srinivasan ................... | 717/119 |

OTHER PUBLICATIONS

B. R. Rau. Iterative modulo scheduling: An algorithm for software pipelining loops. In Proc. of the 27th Annual International Symposium on Microarchitecture, pp. 63-74, Nov. 1994.
Intel® Itanium™ Architecture Software Developer's Manual, vol. 1: Application Architecture, Section 2.2, pp. 1:169-1:190, Rev. 2.1, Oct. 2002.

* cited by examiner

*Primary Examiner*—Meng-Al T. An
*Assistant Examiner*—Mark P. Francis
(74) *Attorney, Agent, or Firm*—Phillip A. Pedigo

(57) ABSTRACT

A method and apparatus are provided for repacking of memory data. For at least one embodiment, data for a plurality of store instructions in a source code program is loaded from memory into the appropriate sub-location of a proxy storage location. The packed data is then written with a single instruction from the proxy storage location into contiguous memory locations.

15 Claims, 6 Drawing Sheets

DATA REPACKING FOR MEMORY ACCESSES

BACKGROUND

1. Technical Field

The present invention relates generally to information processing systems and, more specifically, to dynamically repacking data to facilitate consolidation of multiple memory write instructions.

2. Background Art

As processor designers continue to make strides in the performance speed of processors, the gap between processor speed and the speed of memory hierarchy technology has widened. Accordingly, the performance penalty associated with memory fetches becomes relatively more expensive as processor speeds increase.

Various approaches have been implemented in an attempt to decrease the impact of memory fetches during the execution of a processor. One such approach is known as coalescing. Coalescing is an approach that can be implemented to optimize the binary code generated during compilation of a software program. In the coalescing approach, several memory accesses for individual data are lumped into one aggregate memory access for one aggregate datum. On most processors, coalescing can be seen as the replacement of two store instructions for x-wide data from contiguous memory zones with one store instruction for 2x-wide data, where the 2x-wide data represents the coalesced data of the two x-wide instructions. For example, the two lines of pseudo-code below:

```
store_1byte_starting_at (data1, address)
store_1byte_starting_at (data2, address + 1)
can be coalesced and replaced by a single line:
    store_2bytes_starting_at(coalesced_data_address).
```

Accordingly, by storing multiple bytes of coalesced data at once, the cost usually associated with issuing a memory write operation (such as, e.g., a store instruction) may be amortized across the several such memory write operations. As used herein, the word "operation" is used to indicate the operation of a processor to process a single instruction, such as a store instruction. One skilled in the art will recognize that a single store instruction may be processed as a plurality of micro-operations, but that processing of the store instruction is nonetheless referred to herein as a single "operation."

Coalescing is a useful approach to avoid certain cache penalties associated with successive store operations. A cache penalty is any additional cost incurred in implementation-dependent corner cases, such as the inability of a cache implementation to service two stores to the same cache line within a 1-cycle time budget.

In addition, it has been observed that contiguous store instructions occur quite frequently in software programs. For instance, it has been observed that, for many software programs, a majority of execution time associated with the program is spent executing a small number of loops, referred to as "hot loops."

Consider the loop

```
for (i=0; i<N; i++) {                   Loop 1
    A[i] = B[i]
}
```

On successive iterations, the value of B[i] is loaded from memory and is stored at A[i]. Accordingly, consecutive store instructions modify contiguous memory addresses. In such a straightforward case, it may be that the successive load instructions in Loop 1 may be coalesced to load more than one piece of data from B in a single operation. It is also possible in the straightforward example of Loop 1, to coalesce the data to be stored in successive locations of the array, A.

A challenge arises, however, for many prior art coalescing schemes when one side of a statement within a loop is not amenable to coalescing. Many prior art coalescing schemes decline to coalesce data when the right-hand side of the assignment statement within a loop does not guarantee contiguous memory accesses. Another challenge for prior art coalescing schemes arises when the statements within a loop modify contiguous memory locations, but the contiguous memory locations are modified out of order. Embodiments of the method and apparatus disclosed herein address these and other concerns related to coalescing schemes.

BRIEF DESCRIPTION OF THE DRAWINGS

The present invention may be understood with reference to the following drawings in which like elements are indicated by like numbers. These drawings are not intended to be limiting but are instead provided to illustrate selected embodiments of a method and apparatus for performing repacking of memory data.

DETAILED DISCUSSION

Figure 1:
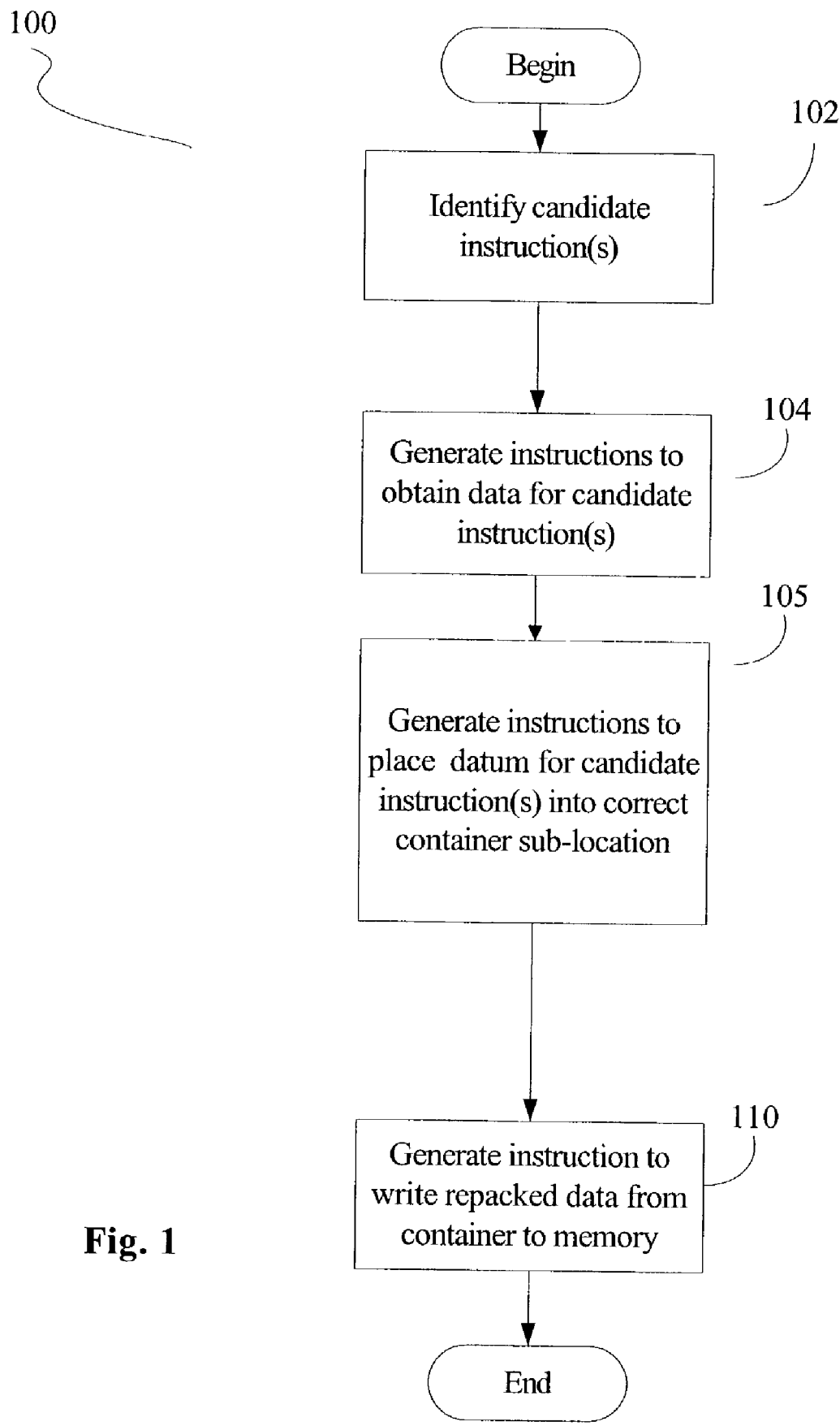
FIG. 1 is a flowchart illustrating at least one embodiment of a method for generating instructions to perform repacking of memory data.
Figure 3:
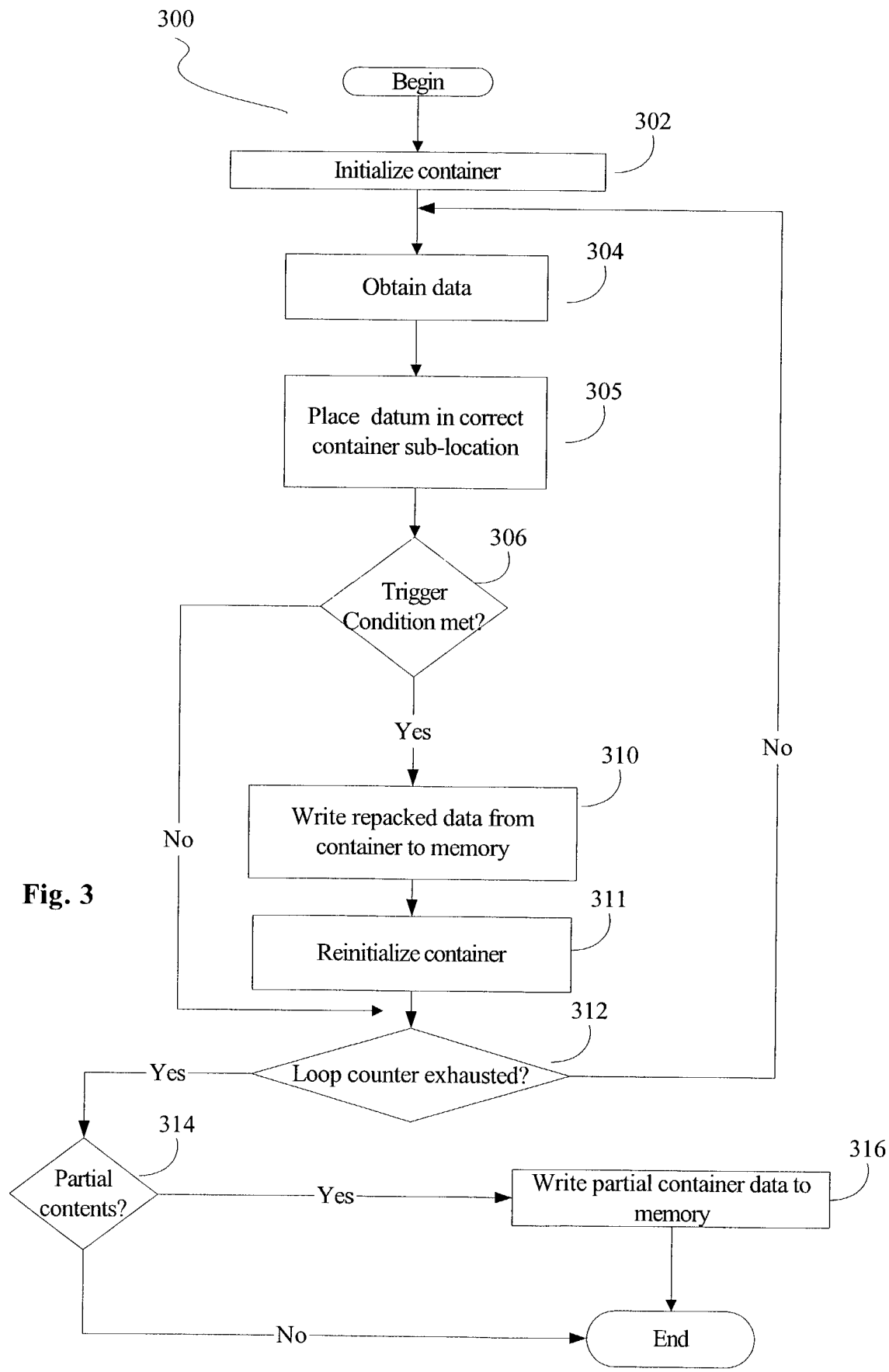
FIG. 3 is a flowchart illustrating at least one embodiment of a method of repacking memory data.
Figure 6:
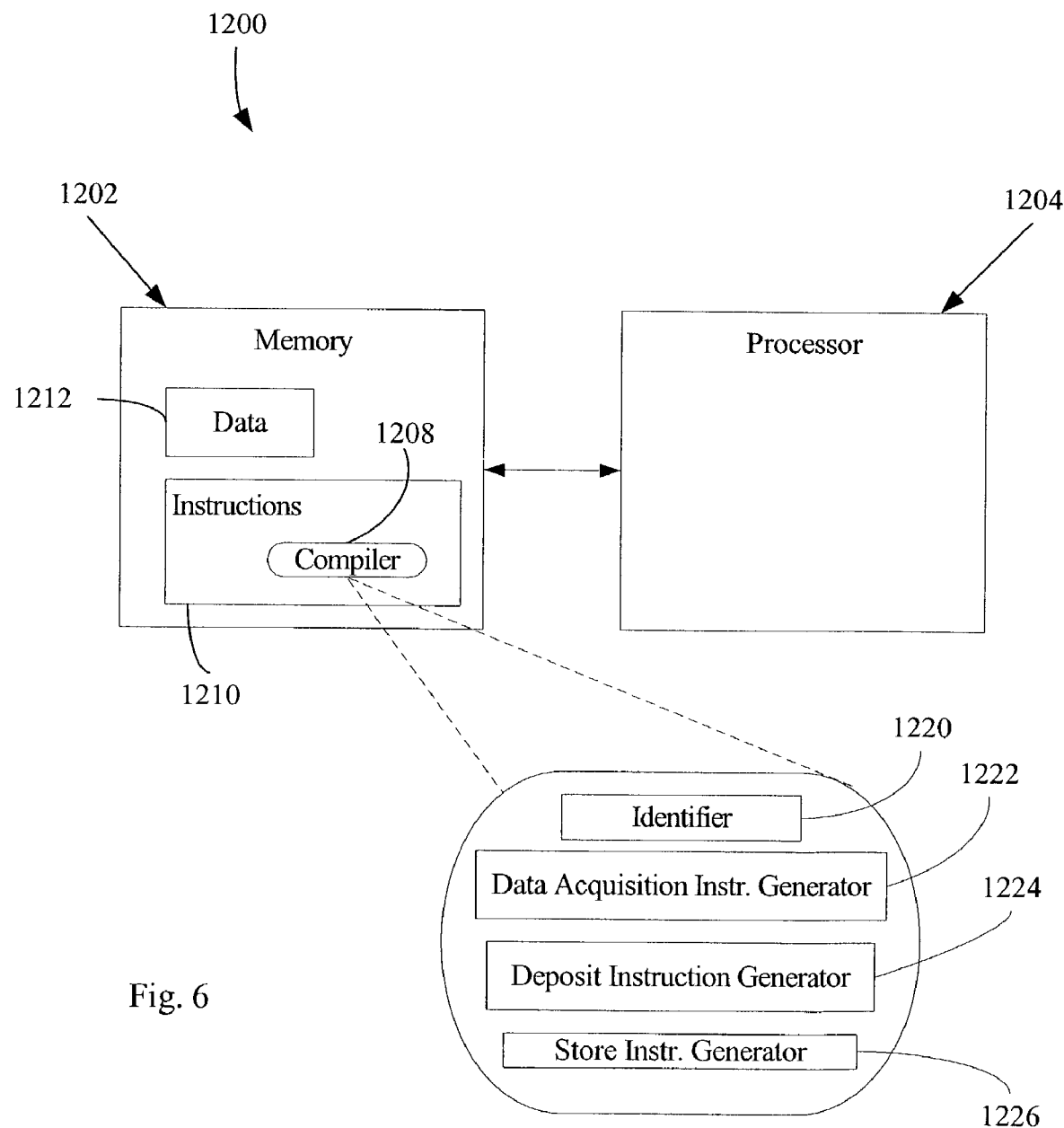
FIG. 6 is a block diagram of a system capable of performing at least one embodiment of a method for repacking memory data.

FIGS. 1 and 3 illustrate methods of facilitating 100 and performing 300 repacking of memory data. As used herein, repacking includes grouping individual data into one properly ordered piece of aggregate data that may be written to memory in a single operation (such as, for example, one machine language "store" instruction). It is contemplated that at least one embodiment of a repacking method 300 (FIG. 3) is accomplished by executing instructions that are generated 100 (FIG. 1), for at least one embodiment, by a compiler 1208 (FIG. 6). The methods 100, 300 of FIGS. 1 and 3, respectively, are discussed separately below.

FIG. 1 is a flowchart illustrating at least one embodiment of a method 100 of generating instructions that, when executed by a processor, facilitate repacking. The method 100 of generating instructions to facilitate repacking can be dynamically performed by software (such as a compiler 1208, FIG. 6). However, the method 100 is not so limited, and can be performed in any other known method such as, for instance, via execution of hand-generated machine instructions.

FIG. 1 illustrates a method of generating 104, 105, 110 instructions that, when executed by a processor, place each datum to be stored during execution of identified instructions into a container 202 (FIG. 2) and then write the aggregate data from the container 202 (FIG. 2) to memory. FIG. 1 illustrates that the method 100 identifies 102 a candidate instruction. Of course, the candidate instruction may be manually identified 102. For at least one embodiment, however, a compiler 1208 (FIG. 6) dynamically identifies 102 a candidate instruction in the software code of the program under compilation, the candidate instruction being amenable to repacking.

Figure 4:
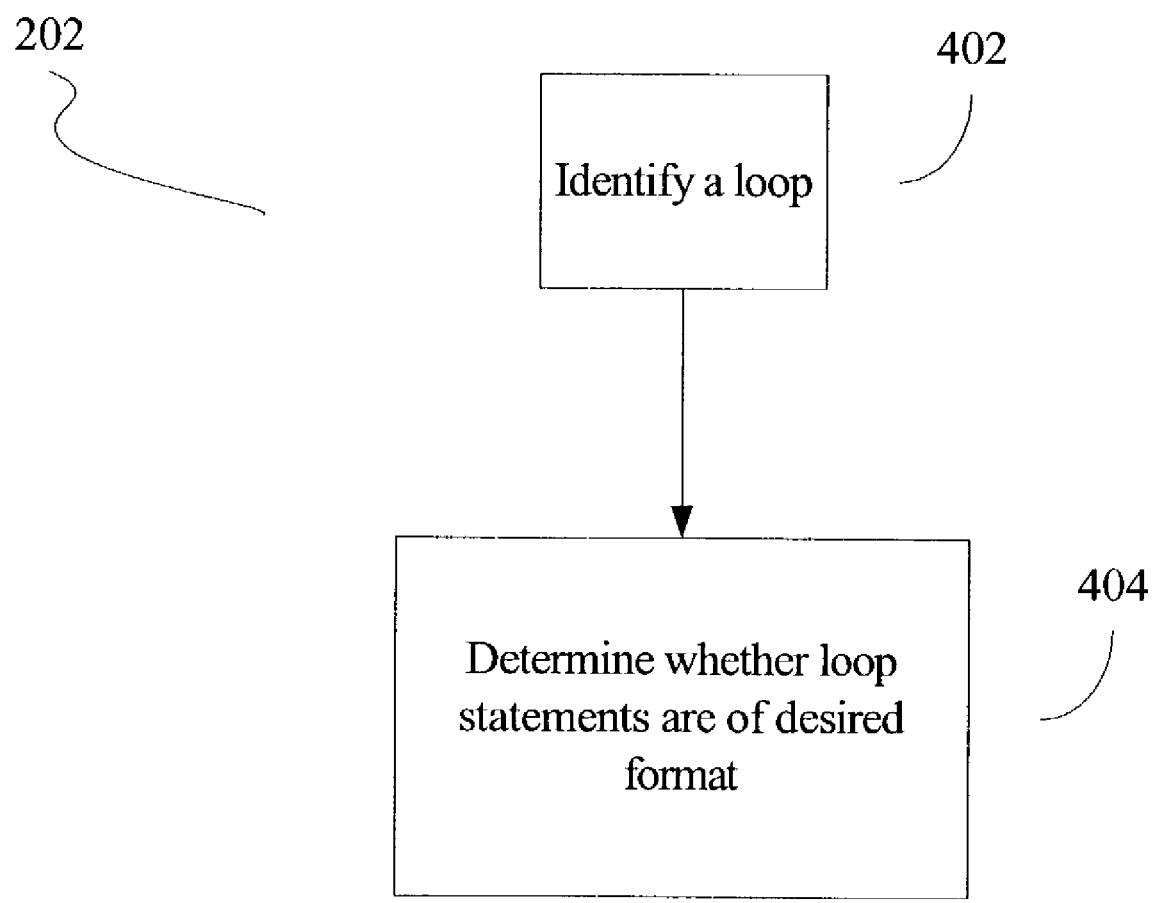
FIG. 4 is a flowchart illustrating at least one embodiment of a method for identifying a candidate instruction.

FIG. 4 is a flowchart further illustrating identification 102 (FIG. 1) of instructions amenable to repacking. One should note that instructions identified 102 by the method 100 might not ordinarily be identified for coalescing under traditional coalescing schemes. For instance, a difficulty arises for many coalescing schemes when one side of a statement within a loop is not amenable to coalescing. Consider the loop

```
for (i=0; i <N; i++) {              Loop 2
    A[i] = B[f(i)]
}
``` where f is an arbitrary function. On successive iterations of Loop 2, say iterations 44 and 45, B[f(44)] and B[f(45)] are accessed (loaded) and those load values are stored in A[44] and A[45], respectively. Due to the lack of predictability introduced by function f, there is no guarantee that two consecutive load instructions, such as B[f(i)] and B[f(i+1)], specify load data stored in contiguous memory locations in the memory hierarchy. However, at compile time it may be apparent that A[44] and A[45] do indeed occupy contiguous memory locations. Nonetheless, many prior art coalescing schemes decline to coalesce data when the right-hand side of the assignment statement within a loop does not guarantee contiguous memory accesses. For the example shown in Loop 2, such a scheme would fail to coalesce the memory accesses for the iterations of Loop 2, even though significant advantage could be realized for doing a single store operation to array A, albeit after multiple load operations from array B.

Figure 2:
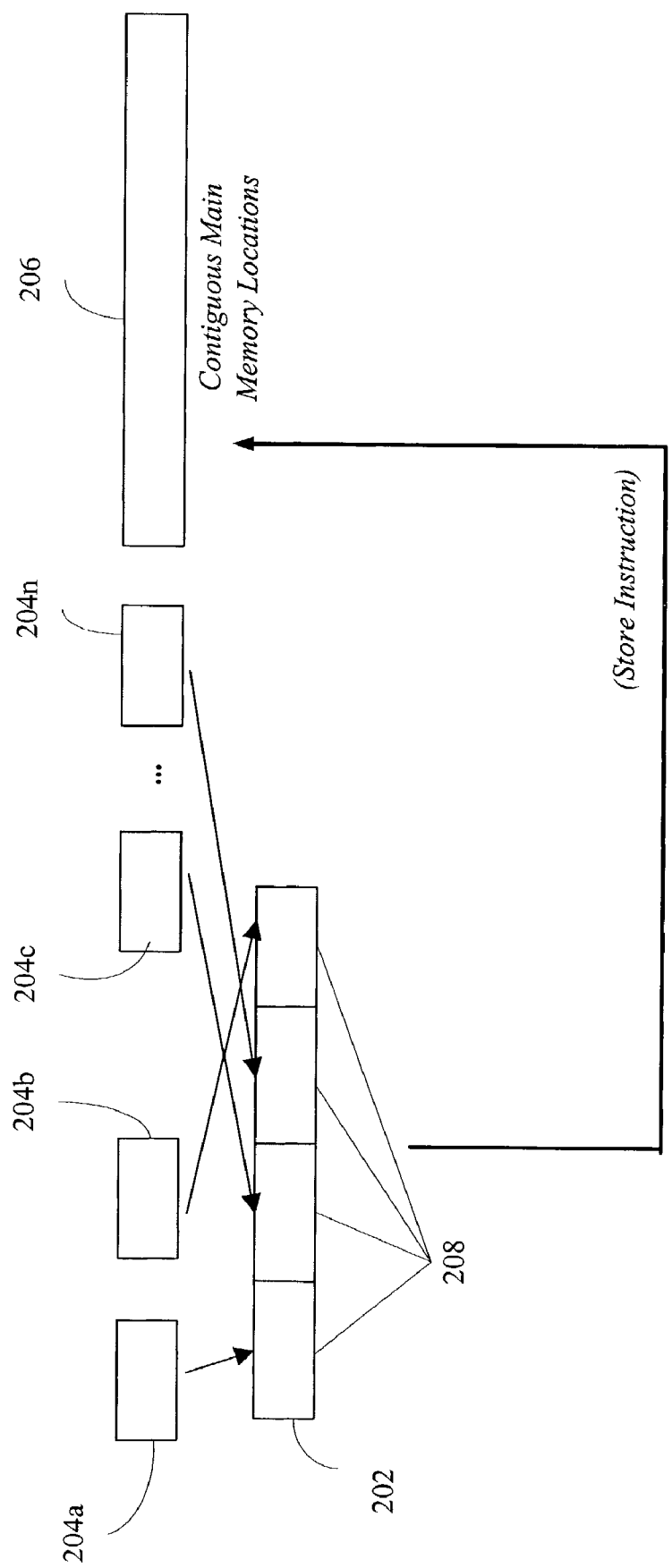
FIG. 2 is a block data flow diagram illustrating the flow of data for an illustrative repacking operation.

FIGS. 2 and 4 illustrate that such instructions may be identified 102 for repacking. To identify 102 instructions amenable to repacking, loop structures within a software program are identified 402. For at least one embodiment, only instructions within a loop are identified 102 as candidates for repacking. This approach is based on the observation, discussed above, that most of the execution time of some software programs is spent in a few hot loops, such as loops that perform sequential array accesses. The method further determines 404 whether the statements within the identified loop are of the desired format type.

Regarding the format determination 404, it is determined whether the identified loop is of a format that would likely provide performance improvements if repacked. If a predictable pattern of memory accesses can be identified throughout the predicted life of the loop, and that pattern involves store operations to contiguous memory locations, then the store operations may be candidates for repacking. Further discussion of the format determination 404 is made in reference to an example. Consider the following illustrative code, where the loop index is indicated by the variable i:

```
for (...;...;i += k) {                        Loop 3 - ("repackable
    A[f1(i)] = Fool(B1[g11(i)],B2[g21(i)]...);            loop")
    ...
    A[fk(i)] = Fook(B1[g1k(i)],B2[g2k(i)]...)
}
``` where f1 through fk are simple uniform functions of i. A uniform function is a function that maps x to x+k, where k is a known, constant integer. For example, x+3 and x−12 are both uniform functions of x. In addition, A, B1, B2, etc., as set forth in Loop 3 are storage constructs in memory (such as arrays). Also, k is a constant representing the number of loop statements that write into the data structure being considered for repacking. In the loop 3 example, k represents the number of statements in Loop 3 that write into Array A. The value of k may take into account whether the loop is unrolled or not. For at least one embodiment, k is a power of 2 for memory alignment purposes. Furthermore Fool through Fook are expressions. Loop 3 illustrates a specific type of loop structure referred to herein as a "repackable loop." A repackable loop bears the characteristic that the expressions on the left-hand side of all the assignment statements within the loop represent store operations to respective contiguous memory locations. Candidate instructions can therefore be identified in source code by determining whether the source code contains a predetermined pattern of memory accesses. Assignment statements such as those set forth in the body of Loop 3 are referred to herein as "memory storage instructions." Some examples of loop constructs that satisfy the repackable loop format are set forth below:

```
         for (row=0; row<=numRows+1; row++) {    Loop 4 - ("repackable
             Rowsptr2[row] = rowsptr1[row];               loop"-Ex. 1)
         }
and
         for (; j>3; j -= 4) {                   Loop 5 - ("repackable
             yy[j] = yy[j-1];                             loop"-Ex. 2)
             yy[j-1] = yy[j-2];
             yy[j-2] = yy[j-3];
             yy[j-3] = yy[j-4];
         }
```

Loop 4 satisfies the repackable loop format specified in Loop 3: Arrays A and B are satisfied by rowsptr1 and rowsptr2, respectively; constant k is equal to 1; and Fool . . . Fook are the identity function. Similarly, Loop 5 also satisfies the repackable loop format specified in Loop 3. In Loop 5, both arrays A and B are satisfied by array yy; constant k is equal to 4; and Fool . . . Fook are the identity function.

Accordingly, FIGS. 1 and 4 illustrate a method 100 that identifies 102 candidate instructions by identifying 402 a loop and determining 404 whether the identified loop satisfies the format requirements of a repackable loop. The requirements of a repackable loop help to identify those loops whose statements result in a series of contiguous memory writes.

Returning to FIG. 1, and consulting FIGS. 2 and 3 as well, it can be seen that instructions for obtaining data for the candidate instructions are generated at block 104. As is discussed above, a candidate instruction is an assignment instruction that occurs within a loop. A loop that satisfies the criteria as set forth in Loop 3 contains assignment statements requiring a fetch (such as execution of a load instruction) of data from memory. FIG. 1 illustrates that, for each candidate instruction identified 102, instructions are generated 104 to obtain the data identified by the right-hand side of the assignment statement.

Consider, for example, the code set forth in Loop 5, above. Each iteration of Loop 5 yields, under traditional compilation principles, four load instructions and four store instructions. Without using the embodiments of a repacking method described herein, a typical compiler would schedule four load instructions and four store instructions. According to at least one embodiment of the repacking method described herein, the four store instructions are coalesced 110 (FIG. 1) into one store instruction after the load data has been placed 305 (FIG. 3) into the container 202 (FIG. 2). In order to repack the load data, however, each piece of data is first retrieved from memory. Accordingly, the appropriate memory fetch instructions are generated 104 as described immediately below.

During an iteration of Loop 5, four data yy[j-1] through yy[j-4] are loaded. Assuming that each load data is a one-byte value, the following example load instructions might be generated 104. The following sample instructions are based on the instruction sets of the 64-bit Itanium® and Itanium® II microprocessors available from Intel Corporation:

```
L1₁:  ld1  r25=[r26], -4   //r26 = addr of yy[j-1]
                           //load 1 byte of data from addr in r26 to r25;
                           decrement r26
                           //by 4
      ld1  r20=[r23], -4   //r23=addr of yy[j-2];;
                           // load 1 byte of data from addr in r23 to r20;
                           decrement r23
                           //by 4
      ld1  r35=[r15], -4   //r15=addr of yy[j-3]
                           //load 1 byte of data from addr in r15 to r35;
                           decrement r15
                           //by 4
      ld1  r36=[r11], -4   //r11=addr of yy[j-4];;
                           //load 1 byte of data from addr in r11 to r36;
                           decrement r11
                           //by 4
```

Assuming that a processor executes two load instructions per machine cycle, the L1₁ code outlined above may be executed in two cycles.

As a result of the load instructions set forth in L1₁, above, the following architectural state results: r25 contains 1 byte of load data, r20 contains one byte of load data, r35 contains one byte of load data, and r36 contains one byte of load data. Accordingly, when executed by a processor (1204, FIG. 6), the instructions generated at block 104 provide for obtaining 304 (FIG. 3) data to be repacked. Thus, obtaining 304 (FIG. 3) data for candidate instructions may be provided for via generation 104 of instructions that, when executed by a processor 1204 (FIG. 6), cause the processor 1204 to obtain the data from memory 1202 (FIG. 6) according to the right-hand side of the assignment statements identified 102 (FIG. 1) earlier. One skilled in the art will recognize that the illustrative code of L1₁, above, illustrates sample load instructions for the assignment statements of Loop 5. Such statements are presented sequentially in L1₁ for the purposes of illustration only. Indeed, the further discussion of FIG. 3, below, indicates that each load instruction may be part of a larger set of instructions that is performed iteratively.

For purposes of further discussing the generation 104 of instructions to facilitate the acquisition 304 of load data, reference is made to the illustrative example set forth in Loop 4, above, as well as to FIGS. 1 and 3. For simplicity, the following discussion assumes that the trip count, or number of iterations, of the code in Loop 4 can be determined at compile time. For instance, assuming that numRows is a multiple of eight, one can predict that the assignment statement in Loop 4 will be performed at least eight times. For purposes of illustration, unrolling Loop 4 by a factor of eight results in eight iterations of the loop, as follows:

```
for (row=0; row<=numRow+1; rows+=8) {
    rowsptr2[row] = rowsptr1[row];           // First copy
    rowsptr2[row+1] = rowsptr1[row +1];      // Second copy
    ...
    rowsptr2[row+7] = rowsptr1[row+7];       // Eighth copy
}
```

Accordingly, for each iteration of Loop 4, a value is loaded 304 from memory (i.e., from rowsptr1[row]) and is to be stored at another location in memory (i.e., in the rowsptr2 array).

FIGS. 1, 2 and 3 indicate that an individual piece of data obtained at block 304 is placed 305 in the appropriate sub-location 208 of a container 202. One or more instructions to facilitate the placement 305 are generated at block 105 (FIG. 1). The generation 105 of a deposit instruction (discussed in further detail below) allows data to be repacked into the appropriate sub-location 208 within a container 202 (see FIG. 2). The deposit instruction allows repacking of out-of-order data, which is a challenge for traditional coalescing schemes. Consideration of Loop 6, below, reveals the challenge for existing coalescing schemes. Consider,

```
for (i=0; i <N; i+=4) {           Loop 6
    temp = A[i];
    A[i] = newValue;
    A[i + 3] = A [i + 2];
    A[i + 2] = A[i + 1];
    A[i + 1] = temp;
}
```

During the execution of Loop 6, contiguous memory addresses A[i], A[i+1], and A[i+2] are modified, but they are not modified in sequential order. That is, in the last instruction of the Loop 6, A[i+1] is modified after A[i+2] and A[i] have already been modified. To coalesce the store data created by the instructions within Loop 6, placement of each datum should be directed such that each datum is placed in the correct position within a larger collection of coalesced data.

According to at least one embodiment of the method described herein, instructions to place the datum in the appropriate sub-location 208 are generated at block 105. The following discussion will continue with, and build upon, the preceding example based on Loop 5. To repack the load data into the appropriate sub-location 208 within a container 202, deposit instructions may be generated 105 as follows. Again, the deposit instructions indicated in bold face below are based on the instruction sets of the 64-bit Itanium® and Itanium® II microprocessors available from Intel Corporation:

| | | | |
|---|---|---|---|
| $L1_2$: | ld1 | r25=[r26], −4 | //r26 = addr of yy[j−1] |
| | | | //load 1 byte of data from addr in r26 to r25; |
| | | | //decrement r26 by 4 |
| | dep.z | r37=r25,24,8 | //r37 collects 1st byte |
| | ld1 | r20=[r23], −4 | //r23=addr of yy[j−2] |
| | | | //load 1 byte of data from addr in r23 to r20; |
| | | | //decrement r23 by 4 |
| | dep | r37=r20,r37,16,8 | //r37 collects 2nd byte |
| | ld1 | r35=[r15], −4 | //r15=addr of yy[j−3] |
| | | | //load 1 byte of data from addr in r15 to r35; |
| | | | //decrement r15 by 4 |
| | dep | r37=r35,r37,8,8 | //r37 collects 3rd byte |
| | ld1 | r36=[r11], −4 | //r11=addr of yy[j−4] |
| | | | //load 1 byte of data from addr in r11 to r36; |
| | | | //decrement r11 by 4 |
| | dep | r37=r36,r37,0,8 | //r37 collects last byte |

The code of $L1_1$ and $L1_2$ provided above is for illustrative purposes only, and should not be taken to limit the embodiments described herein to any particular architecture or machine language. Instead, the sample code denoted by $L1_1$ and $L1_2$ above is intended to provide specific examples showing, respectively, 1) instructions for fetching load data for an unrolled loop that is amenable to repacking and 2) depositing the load data into the proper locations within a container 202.

Further discussion of the container 202 refers to FIG. 2. The container 202 is a temporary storage location, referred to herein as a proxy storage location, in which data 204a through 204n, which is associated with the statements in the identified instructions, may be held before they are stored 310 to contiguous memory locations 206 during a coalesced store operation.

The container 202 illustrated in FIG. 2 may be any storage structure directly controlled by instructions in the instruction set of a processor in a computing system. In other words, it is a structure for which there are architectural control instructions defined. It is therefore an architecturally-visible storage structure that can be addresses by an instruction in the instruction set. For example, the container 202 may be a register. For at least one other embodiment, the container 202 may be a scratchpad. In either case, access to a register or a scratchpad is typically much faster than access to main memory.

As contemplated by the embodiments discussed herein, the container 202 differs from a cache or main memory because caches and main memory typically are not directly controlled by instructions that are defined in the architecture of a processor. For example, although a processor's instruction set may include an instruction to purge a cache, there are typically no instructions that allow the processor to control normal operation of the cache. As will be discussed in further detail below, for at least one embodiment of a repacking method, the container 202 is a register that is directly manipulated via a "deposit" instruction that is defined in the instruction set for a processor in which the register resides.

For purposes of illustration, FIG. 2 represents four pieces of data 204a through 204n, but one skilled in the art will recognize that the embodiments described herein may be performed on any number of instructions that each stores data to a respective contiguous memory location. One approach for determining how much data should be repacked into a container 202 is to identify the size of the container and the size of the individual pieces of data that are to be repacked. For instance, for a 64-bit container, increased efficiency is realized when 64 bits of data are repacked into the container 202 before the store operation writes the repacked data to memory. If the data being repacked is of 8-bit granularity, then data for eight store instructions can be repacked into the container and stored to memory in one store operation. In such cases, the container 202 can be considered to include multiple logical sub-locations 208, where each sub-location 208 is capable of holding a single piece of repacked data.

FIGS. 1 and 3 illustrate that instructions generated at block 105 provide for multiple placements 305 of data into respective sub-locations 208 until a trigger condition is met 306 and the loop counter is exhausted 312. To further understand the loading 305 of the container 202 (FIG. 2), a discussion of the function of the deposit instruction is warranted.

Figure 5:
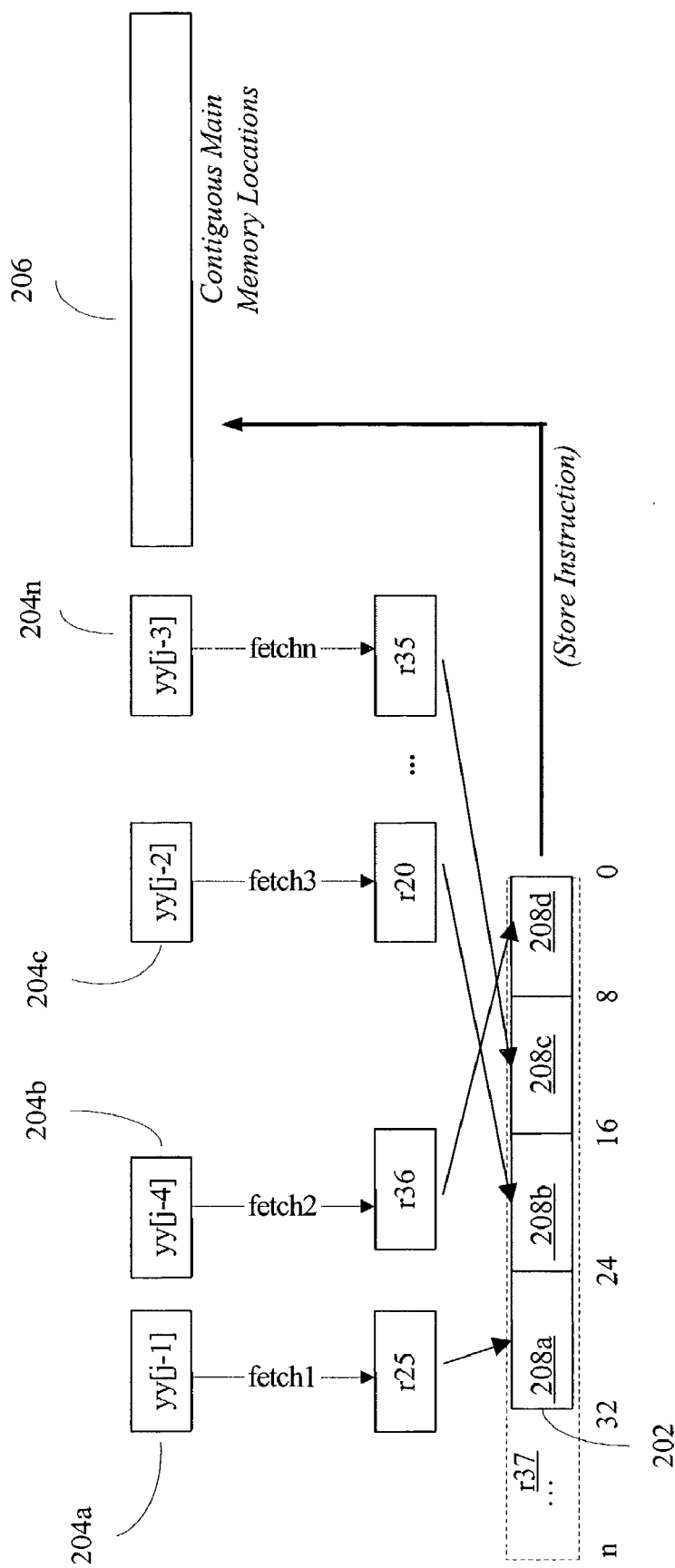
FIG. 5 is a block data flow diagram further illustrating the flow of data for an illustrative repacking operation.

Reference is made to FIGS. 2 and 5 for a further discussion of the deposit instructions generated at block 105 (FIG. 1) and executed at block 305 (FIG. 3). The deposit instruction, as used herein, refers to any instruction by which separate pieces of load data 204a-204n, each associated with a different memory fetch instruction fetcha-fetchn, are packed, in order, into the sub-locations 208 of a container 202.

For purposes of illustration, reference will be made to the deposit instruction as defined in the instruction set for the Itanium® and Itanium® II microprocessors available from Intel Corporation. However, any instruction that accomplishes the function described herein will suffice. A deposit instruction and a deposit.z instruction have the following syntax, respectively:

.dep rA=rB, rC, p, n dep.z rA=rB, p, n

For the deposit instruction, rA, rB, rC, p, and n are the target register, the register providing the deposited data, the register providing the value for those bits of the target register not otherwise modified by the current instruction, the start position in the target register where the data will be deposited, and the number of bits to be extracted from rB, respectively. The n deposited bits are the first n bits from rB. Often, rA and rC are the same register, so that the current value of rA is modified with the new data deposit, without corrupting the other existing bits in rA. In essence, defining rA and rC to be the same register results in otherwise unmodified bits in rA being copied over to themselves. In such case, the effect of the deposit instruction is to plug the first n bits of rB into rA, and copy the remaining bits of rA over themselves.

The dep.z instruction is useful when, instead of copying the otherwise unmodified bits of rA from another register, it is desirous to force such remaining bits to zero. In such case, the rC argument is unnecessary. For at least one embodiment, the dep.z instruction, or a functional equivalent, may be useful in initializing 302, 311 the contents of a container 202 to zero. FIGS. 1 and 3 illustrate that the instructions generated at block 104 may include instructions to initialize 302, 311 the container 202 (FIG. 2). A dep.z instruction may used to accomplish such initialization.

The sample code set forth at $L1_2$, above, illustrates that, by utilizing a deposit instruction, such as the dep and dep.z instructions discussed above, instructions may be generated 105 to initialize 302 the container and place 305 the loaded values from addresses contained in registers r11, r26, r15, r23, r26 to their proper sub-location 208 in the container 202. Accordingly, for the example instructions indicated in bold type in $L1_2$, above, the instructions are generated 105 to have the following effect, assuming at least a 32-bit container. The dep.z instruction moves the first 8 bits of r25 into r37, starting at bit 24 of r37. Bit 24 represents the least significant bit of r37 to be modified, with the deposited bit field extending toward the most significant bit of the register. The remaining (i.e., otherwise unmodified) bits of r37 are forced to zero:

| R37 | | | | |
|---|---|---|---|---|
| first 8 bits from r25 (1) | 000 ... | ... | ... 000 | |
| n    32 | 24 | 16 | 8 | 0 |

The second deposit instruction moves the first 8 bits from register r20 into r37 starting at bit position 16 and depositing toward the most significant bit of r37, resulting in a deposit of the first 8 bits from r20 into bits 16-23 of r37. In addition, the remaining bits (bits 0-15 and 24-n) of register r37 are copied to themselves such that the current value of bits 24-31 remain unchanged:

| R37 | | | | |
|---|---|---|---|---|
| first 8 bits from r25 (1) | first 8 bits from r20 (2) | | | |
| n    32 | 24 | 16 | 8 | 0 |

Similarly, the third deposit instruction moves the first 8 bits from register r35 into r37 starting at bit position 8 and depositing toward the most significant bit of r37, resulting in a deposit of the first 8 bits from r36 into bits 8-15 of r37. In addition, the remaining bits (bits 0-7 and 16-n) of register r37 are copied to themselves such that the current value of bits 16-31 remain unchanged:

| R37 | | | | |
|---|---|---|---|---|
| first 8 bits from r25 (1) | first 8 bits from r20 (2) | first 8 bits from r35 (3) | | |
| n    32 | 24 | 16 | 8 | 0 |

The fourth deposit instruction operates as those discussed above. The instruction moves the first 8 bits from 36 into register 37 starting at bit position 0 and depositing toward the most significant bit of r37, resulting in a deposit of the first 8 bits from r36 into bits 0-7 of r37. In addition, the remaining bits (bits 8-32 of register r38 are copied to themselves such that the current value of bits 8-31 remain unchanged:

EXAMPLE 1

| R37 | | | |
|---|---|---|---|
| first 8 bits from r25 (1) | first 8 bits from r20 (2) | first 8 bits from r35 (3) | first 8 bits from r36 (4) |
| n    32 | 24 | 16 | 8    0 |

The preceding discussion, along with FIGS. 1, 2, 3 and 5, thus illustrate that embodiments of the repacking method discussed herein accommodate placement 305 of data into a single container 202 when the data to be repacked comes originates at noncontiguous memory locations 204a-204n. In addition, because a deposit instruction allows a sub-location 208 within a container 202 to be specified, embodiments of the repacking methods 100, 300 discussed herein provide for loading the container 202 out of order. For instance, the embodiments 100, 300 discussed herein could easily handle the following re-ordered code excerpt of $L1_2$:

```
dep.z   r37=r20,16,8      //r37 collects 2nd byte; zero remaining bits
dep     r37=r25,r37,24,8  //r37 collects 1st byte
dep     r38=r35,r37,8,8   //r37 collects 3rd byte
dep     r38=r36,r37,0,8   //r37 collects last byte.
```

In such case, the deposit operations labeled as (1), (2), (3), (4) in Example 1 would instead occur in the following order: (2), (1), (3), (4). Accordingly, the repacking embodiments 100, 300 described herein accommodate two types of freedom regarding the repacked data: 1) the data may originate in non-contiguous memory locations and 2) each piece of repacked data may be deposited into the container 202 in any order with respect to the other pieces of repacked data.

FIGS. 1 and 3 illustrate that the instructions generated 105 for placement of data into the container 202 may include a trigger condition check 306. For one embodiment, the trigger condition check 306 determines whether a maximum number of deposit instructions have been directed to the container 202. If so, the contents of the container 202 should be stored to memory in order to avoid inadvertently overwriting container data. For at least one embodiment, the trigger condition is satisfied after n deposits have been made to the container 202, where n is the number of logical sub-locations 208 in the container 202. For such embodiment, it is assumed that a different one of the n sub-locations 208 is modified to hold repacked data during each of the n deposits. Accordingly, after n deposits the container 202 holds n pieces of correctly ordered repacked data to be written to a single contiguous memory location.

In such embodiment, the trigger condition check 306 may take the form of a modulo operation, x mod L, where L is the number of sub-locations 208 in the container and x is the number of deposit instructions that have been performed to the container without writing the container contents to memory. The variable x thus represents the number of sub-locations 208 that have changed since the last store to memory, and x is incremented each time a deposit instruction is performed to the container. If x mod L=0, then the trigger condition is met, and operation continues at block 310. If the trigger condition is not met, then processing continues at block 312, discussed below.

In contrast, FIGS. 1 and 3 illustrate that a coalesced store instruction (or its functional equivalent) is generated 110, and such store instruction is performed 310, when the trigger condition check 306 indicates that the trigger condition has occurred. In at least one embodiment, the instruction is a store instruction that functions to write the repacked data from the container 202 to the desired contiguous memory locations in a single operation. That is, once deposit instructions are used to place loaded values at the correct location in the container 202, the information in the container 202 can be stored 310 in one coalesced operation, resulting in the same functionality as if the individual loaded values had been stored to memory separately. Based on the assumption stated above (i.e., a store is to be scheduled after n deposits of data to n sub-locations 208), a store instruction is scheduled if and only if the container 202 has received n deposits of data, where n is the number of sub-locations 208. Accordingly, even if there are unexecuted deposits for the identified loop, the unexecuted deposits will not be performed if all sub-locations 208 have been deposited and the contents of the container 202 therefore need to be written to memory. After the memory write 310, the container 202 value is re-initialized 311 to an all-zero value before processing continues at block 312.

At block 312, it is determined whether the loop counter is exhausted. If the loop counter is not yet exhausted, then processing continues at block 304 in order to obtain 304 more load data and write the load data 305 to the appropriate sub-location 208. Processing then continues as discussed above, with blocks 304, 305, 306, 310, 311 and 312 being performed iteratively until the loop counter is exhausted.

In some cases, the loop trip count is a multiple of the number of sub-locations 208. However, in other cases the loop trip count is not a multiple of the sub-location 208 count. In such case, partial container contents may have been modified 305, but not yet written to memory, at the time that the loop counter check 312 evaluates to a true value. Such situation can occur, for instance, when the trigger condition check 306 evaluates to a false value but the loop counter check 312 evaluates to a true value. In such cases, if such partial unwritten container 202 contents do exist (as determined at block 314), then the contents are written to memory 316 and processing then ends. Otherwise, processing ends without the additional write operation 316.

In the preceding description, various aspects of repacking memory data have been described. For purposes of explanation, specific numbers, examples, systems and configurations were set forth in order to provide a more thorough understanding. However, those of ordinary skill in the art, having the benefit of this disclosure, will appreciate that the invention may be practiced without these specific details. In other instances, various well-known features, methods, procedures, components, and circuits were omitted or simplified in order not to obscure the method.

Embodiments of the methods 100, 300 may be implemented in hardware, software, firmware, or a combination of such implementation approaches. Embodiments of the methods 100, 300 may be implemented as computer programs executing on programmable systems comprising at least one processor, a data storage system (including volatile and non-volatile memory and/or storage elements), at least one input device, and at least one output device. Program code may be applied to input source code to perform the functions described herein and generate output code, referred to herein as binary code. The output code may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the methods described herein are not limited in scope to any particular programming language. In any case, the language may be a compiled or interpreted language The program code may be stored on a storage media or device (e.g., hard disk drive, floppy disk drive, read only memory (ROM), CD-ROM device, flash memory device, digital versatile disk (DVD), or other storage device) readable by a general or special purpose programmable processing system. The instructions, accessible to a processor in a processing system, provide for configuring and operating the processing system when the storage media or device is read by the processing system to perform the procedures described herein. Embodiments of the invention may also be considered to be implemented as a machine-readable storage medium, configured for use with a processing system where the storage medium so configured causes the processing system to operate in a specific and predefined manner to perform the functions described herein.

An example of one such type of processing system is shown in FIG. 6. Sample system 1200 may be used, for example, to execute the processing for a method of generating instructions to perform repacking of memory data, such as the embodiments described herein. Sample system 1200 may also execute enhanced binary files generated in accordance with at least one embodiment of the methods described herein, where the enhanced binary files provide for a method of repacking memory data as described herein. Sample system 1200 is representative of processing systems based on the Pentium®, Pentium® Pro, Pentium® II, Pentium® III, Pentium® 4, and Itanium® and Itanium® II microprocessors available from Intel Corporation, although other systems (including personal computers (PCs) having other microprocessors, engineering workstations, set-top boxes, personal digital assistants and the like) may also be used. In one embodiment, sample system 400 may be executing a version of the WINDOWS™ operating system available from Microsoft Corporation, although other operating systems and graphical user interfaces, for example, may also be used.

Referring to FIG. 6, sample processing system 1200 includes a memory system 1202 and a processor 1204. Memory system 1202 includes a memory storage device that may store instructions 1210 and data 1212 for controlling the operation of the processor 1204. For example, instructions 1210 may include a compiler program 1208 that, when executed, causes the processor 1204 to compile a program (not shown) that resides in the memory system 1202. Memory 1202 holds the program to be compiled, intermediate forms of the program, and a resulting compiled program. For at least one embodiment, the compiler program 1208 contains instructions that cause the processor 1204 to generate 100 instructions which, when executed by the processor 1204, cause the processor 1204 to perform an embodiment of a method 300 of repacking data as described herein. For such embodiment, instructions 1210 may also include a binary file generated 100 in accordance with at least one embodiment of the present invention.

Memory system 1202 is intended as a generalized representation of memory and may include a variety of forms of memory storage devices, such as a hard drive, CD-ROM, random access memory (RAM), dynamic random access memory (DRAM), static random access memory (SRAM) and related circuitry. Memory system 1202 may store instructions 1210 and/or data 1212 represented by data signals that may be executed by processor 1204. The instructions 1210 and/or data 1212 may include code for performing any or all of the techniques discussed herein. At least one embodiment of a method for generating instructions to perform repacking of memory data is related to the use of the compiler 1208 in system 1200 to cause the processor 1204 to perform repacking as described above.

FIG. 6 illustrates that compiler 1208 includes various instructions that can be logically grouped into modules according to the functions that the instructions perform. Specifically, FIGS. 1, 4 and 6 illustrate that compiler 1208 may include an identifier module 1220 that, when executed by the processor 1204, identifies 102 a candidate instruction as described above in connection with FIGS. 1 and 4. The compiler 1208 may also include a data acquisition instruction generator 1222 that, when executed by the processor 1204, generates 104 instructions to obtain data for the candidate instruction(s) as described above in connection with FIGS. 1 and 5. In addition, the compiler 1208 may include a deposit instruction generator 1224 that generates an instruction to place the datum for a candidate instruction into a correct container sub-location as described above in connection with FIGS. 1 and 5. The compiler 1208 may also include a store instruction generator 1226 that generates an instruction to write repacked data from a container to memory as discussed above in connection with FIGS. 1 and 5.

While particular embodiments of the present invention have been shown and described, it will be obvious to those skilled in the art that changes and modifications can be made without departing from the present invention in its broader aspects. The appended claims are to encompass within their scope all such changes and modifications that fall within the true scope of the present invention.

What is claimed is:

1. A method comprising:
   identifying a plurality of memory storage instructions within a loop;
   generating, for each of the plurality of memory storage instructions, an instruction to obtain a storage datum associated with the memory storage instruction;
   generating, for each of the plurality of memory storage instructions, an instruction to place the associated storage datum into a selected sub-location of a proxy storage location wherein generating, for each of the plurality of memory storage instructions, an instruction to place the associated storage datum into a selected sub-location of a proxy storage location includes generating, for each said storage datum, an instruction to place the storage datum into a register; and
   generating a single processor instruction to store the plurality of associated storage data from the proxy storage location into a memory storage device.

2. The method of claim 1, further comprising:
   detecting that a maximum number of storage datum have been placed into the proxy storage location.

3. The method of claim 1, wherein identifying a plurality of memory storage instructions suitable for repacking further comprises:
   identifying a predetermined pattern in a source program.

4. The method of claim 1, wherein:
   the proxy storage location is a hardware register.

5. The method of claim 1, wherein:
   the proxy storage location is a scratchpad.

6. An article comprising:
   a machine-readable storage medium having a plurality of machine accessible instructions;
   wherein, when the instructions are executed by a processor, the instructions cause the processor to implement a method comprising:
   identifying a plurality of memory storage instructions within a loop;
   generating, for each of the plurality of memory storage instructions, an instruction to obtain a storage datum associated with the memory storage instruction;
   generating, for each of the plurality of memory storage instructions, an instruction to place the associated storage datum into a selected sub-location of a proxy storage location, wherein generating, for each of the plurality of memory storage instructions, an instruction to place the associated storage datum into a selected sub-location of a proxy storage location includes generating, for each said storage datum, an instruction to place the storage datum into a register; and
   generating a single processor instruction to store the plurality of associated storage data from the proxy storage location into a memory storage device.

7. The article of claim 6, wherein the plurality of instructions further includes instructions that, when executed by the processor, cause the processor to:
   detect that a maximum number of storage datum have been placed into the proxy storage location.

8. The article of claim 6, wherein identifying a plurality of memory storage instructions further includes identifying a predetermined pattern in a source program.

9. The article of claim 6, wherein generating, for each of the plurality of memory storage instructions, an instruction to place the associated storage datum into a selected sub-location of a proxy storage location further comprises:
   generating, for each said storage datum, an instruction to place the storage datum into a scratchpad.

10. An article comprising:
    a machine-readable storage medium having a plurality of machine accessible instructions;
    wherein, when the instructions are executed by a processor, the instructions cause the processor to implement a method comprising:
    placing each of a plurality of load data into a respective sub-location within a proxy storage location, each load datum corresponding to a different one of a plurality of contiguous locations within a memory storage device, each load datum further corresponding to a memory storage instruction within a loop; and
    writing, in a single operation, the value of the proxy storage location into the contiguous locations of the memory storage device
    wherein placing each of the plurality of load data into a respective sub-location within a proxy storage location includes placing each of the plurality of load data into a register.

11. The article of claim 10 wherein the instructions further include instructions that, when executed by the processor, cause the processor to:
   obtain the plurality of load data from the memory storage device.

12. The article of claim 11, wherein obtaining a plurality of data further includes:
   obtaining each load datum from a location other than its corresponding contiguous location.

13. A system, comprising:
   a processor;
   a proxy storage location; and
   a memory storage device having stored therein a plurality of machine accessible instructions, wherein, when the instructions are executed by a processor, the instructions cause the processor to implement a method comprising:
   placing each of a plurality of load data into a respective sub-location within a proxy storage location, each load datum corresponding to a different one of a plurality of contiguous locations within a memory storage device, each load datum further corresponding to a memory storage instruction within a loop; and
   writing, in a single operation, the value of the proxy storage location into the contiguous locations of the memory storage device
   wherein placing each of the plurality of load data into a respective sub-location within a proxy storage location includes placing each of the plurality of load data into a register.

14. The system of claim 13, wherein the method further includes:
   obtaining the plurality of load data from the memory storage device.

15. The system of claim 14, wherein obtaining the plurality of load data further includes:
   obtaining each datum from a location other than its corresponding contiguous location.

* * * * *